United States Patent [19]

Funada et al.

[11] 4,151,326

[45] Apr. 24, 1979

[54] HOLDING PLATE FOR LIQUID CRYSTAL

[75] Inventors: Fumiaki Funada, Yamatokoriyama; Hiroshi Kuwagaki, Kyoto, both of Japan

[73] Assignee: Sharp Kabushiki Kaisha, Osaka, Japan

[21] Appl. No.: 712,647

[22] Filed: Aug. 9, 1976

[30] Foreign Application Priority Data

Aug. 9, 1975 [JP] Japan .................................. 50-96823

[51] Int. Cl.$^2$ ......................... C09K 3/34; B32B 17/10; G02F 1/16
[52] U.S. Cl. ................................... 428/447; 252/299; 428/1; 428/429; 428/910; 428/913
[58] Field of Search ................... 428/910, 1, 447, 429; 429/913; 350/160 LC, 341, 34 Q; 252/299

[56] References Cited

U.S. PATENT DOCUMENTS

| | | | |
|---|---|---|---|
| 3,395,069 | 7/1968 | Plueddemann | 428/447 |
| 3,728,008 | 4/1973 | Allan | 428/1 |
| 3,833,287 | 9/1974 | Taylor | 350/160 LC |
| 3,854,793 | 12/1974 | Kahn | 428/1 |
| 3,910,682 | 10/1975 | Arai | 428/1 |
| 3,951,845 | 4/1976 | Cole, Jr. | 252/299 |
| 3,973,057 | 8/1976 | Channin | 428/1 |
| 3,983,265 | 9/1976 | Letoffe | 428/429 |
| 3,989,354 | 11/1976 | Dubois | 428/1 |

OTHER PUBLICATIONS

White, J. Applied Physics, 45 (11) Nov. 1974, pp. 4718-4723.
Kahn, Applied Physics Letters, 22 (8), Apr. 15, 1973, pp. 386-388.
Zisman, I and EC Product R & D, 8 (2), Jun. 1969 98-111.

*Primary Examiner*—Ellis Robinson
*Attorney, Agent, or Firm*—Birch, Stewart, Kolasch and Birch

[57] ABSTRACT

A holding plate for a liquid crystal having an electrode on the side contacting with the liquid crystal, characterized in that the plate is coated with a film comprising a certain specific silane compound, which is to be incorporated into a liquid crystal indication apparatus and assures a good homogeneous orientation of the molecules of the liquid crystal at the initial stage (i.e. in a non-excited state).

2 Claims, No Drawings

HOLDING PLATE FOR LIQUID CRYSTAL

The present invention relates to a holding plate for a liquid crystal. More particularly, it relates to a holding plate for a liquid crystal which is to be incorporated into a liquid cyrstal indication apparatus and can assure a good homogeneous orientation of the liquid crystal at the initial stage (i.e. at the non-exciting state).

In liquid crystal indication apparatuses utilizing the modification of the orientation in the molecules of a nematic or cholesteric liquid crystal caused by variation of the intensities of electric field, magnetic field, heat or the like, it is important to arrange said molecules in a good homogeneous orientation state at the initial stage.

For realization of such good homogeneous orientation, there is known a method wherein a holding plate for a liquid crystal is rubbed with a cotton cloth P. Chatelaine: Bull. Soc. Fr. Mineral. Crystallogra., 66, 105 (1943). While this method is effective in aligning the directions of the longitudinal axes of the liquid crystal molecules which are distributed utterly randomly on a plane into the rubbing direction, it is not effective in directing the longitudinal axes of the liquid crystal molecules to a horizontal relation to the surface of the holding plate. The orientation of the liquid crystal molecules depends largely and sensitively on the kind of the material constituting the surface of the holding plate, and a horizontally homogeneous orientation is, in general, hardly obtainable. Especially, in the case of an azoxy liquid crystal, it is impossible to make the horizontally homogeneous orientation on a holding plate of glass by the said rubbing method.

It has now been unexpectedly found that the application of a certain specific silane compound onto the surface of a holding plate which is to be contacted with a liquid crystal makes it possible to arrange the molecules of the liquid crystal in a good state of horizontally homogeneous orientation. The present invention is based on this finding.

According to the present invention, there is provided a holding plate for a liquid crystal having an electrode on the side contacting with the liquid crystal, characterized in that the plate is coated with a film comprising a silane compound as defined below.

The silane compound which constitutes the coating film on the surface of a holding plate according to the present invention is a silane compound having an open chain constituted with at least two carbon atoms and bearing a silicon atom on one terminal carbon atom and a silicon atom or a nitrogen atom on the other terminal carbon atom, said silicon atom bearing at least one hydroxyl group and said nitrogen atom being the nitrogen atom in an amino group. Thus, the silane compound has the fundamental structure of either one of the following formulae:

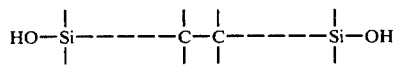

and

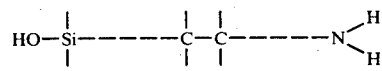

For the formation of the coating film of the silane compound, the silane compound itself may be applied onto the surface of the holding plate. From the practical viewpoint, however, a compound which can form the silane compound in water (hereinafter referred to as "precursor compound") is usually employed instead of such silane compound.

The precursor compound includes those as representable by the formula:

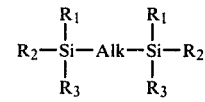

wherein $R_1$, $R_2$ and $R_3$ are each hydrogen, $C_1$-$C_8$ alkyl (preferably methyl), $C_1$-$C_8$ alkoxy (preferably methoxy) or halogen (preferably chlorine) but at least one of them is $C_1$-$C_8$ alkoxy or halogen and Alk is $C_2$-$C_8$ alkylene (preferably ethylene or trimethylene), and also those as representable by the formula:

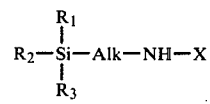

wherein $R_1$, $R_2$, $R_3$ and Alk are each as defined above and X is $C_1$-$C_8$ alkyl (preferably methyl, ethyl or propyl), $C_2$-$C_8$ alkenyl (preferably allyl), $H_2N$-($C_1$-$C_8$)alkyl (preferably aminoethyl or aminopropyl), $C_1$-$C_8$ alkoxycarbonyl ($C_1$-$C_8$)alkyl-NH-($C_1$-$C_8$)alkyl (preferably methoxycarbonylmethylaminoethyl, methoxycarbonylmethylaminopropyl, ethoxycarbonylmethylaminoethyl, ethoxycarbonylmethylaminopropyl, methoxycarbonylethylaminoethyl, methoxycarbonylethylaminopropyl, ethoxycarbonylethylaminoethyl or ethoxycarbonylethylaminopropyl), $H_2N$—($CH_2CH_2$)$_n$—, $H_2N$—($CH_2CH_2CH_2$)$_n$—, H—($NHCH_2CH_2$)$_n$— or H—($NHCH_2CH_2CH_2$)$_n$— (in which $n$ is an integer of not more than 30, preferably of 1 to 20)

Specific examples of the precursor compound are as follows:

$(CH_3O)_3Si(CH_2)_3NH(CH_2)_2NH_2$;
$(CH_3O)_3Si(CH_2)_3NH(CH_2)_2NHCH_2COOCH_3$;
$CH_3O)_3Si(CH_2)_2NH(CH_2CH_2NH)_nH$;
$Cl_3Si(CH_2)_3NH(CH_2)_2NHCH_2COOCH_3$;
$Cl_3Si(CH_2)_3NH(CH_2CH_2NH)_nH$;
$Cl_3Si(CH_2)_3NH(CH_2)_2NH_2$;
$Cl_2(CH_3)Si(CH_2)_3NH(CH_2)_2NH_2$;
$(CH_3O)_3Si(CH_2)_2NHCH_2CH=CH_2$, etc.

As a typical example of the procedure for formation of the coating film, the precursor compound is dissolved into water to make a concentration of 0.001 to 0.1 % by weight (preferably of about 0.01 % by weight), a plate made of glass having a transparent film of electroconductive material (e.g. indium oxide) as an electrode on the surface is dipped in the resulting solution and the plate in such solution is subjected to ultrasonic excitement, followed by taking out from the solution and drying.

When contacted with the thus coated surface of the holding plate, the molecules of a liquid crystal are arranged with their longitudinal axes parallel to such surface. Since, however, the directions of the longitudinal axes of the molecules may not be well arranged within a plane, it is preferable to orientate the molecule arrangement in one direction by the said rubbing method, whereby a quite satisfactory horizontal homogeneous orientation can be surely achieved.

As the liquid crystal of which the molecules can be well arranged by application of the present invention to give a good horizontal homogeneous orientation, there may be exemplified liquid crystals of Schiff bases, biphenyl compounds, azoxy compounds, azo compounds, esters, cholesterol derivatives, etc. Mixtures of these liquid crystals or of these liquid crystals with optically active substances are also examples of such liquid crystals.

The holding plate of the present invention is advantageously utilizable in any liquid crystal indication apparatus which requires a horizontal homogeneous orientation at the initial stage. Thus, it may be applied to liquid crystal indication apparatuses of twisted nematic electric field effect type, Fredericksz type (induced birefringence electric field effect type), cholestericnematic phase transition type, dynamic scattering type, orientation fluctuation type, etc.

As stated above, the present invention makes it possible the arrangement of the liquid crystal molecules in a horizontal homogeneous orientation. As the result, the grade of indication such as uniformity of indication, integrity of visual direction, stability of threshold value in photoelectric effect and improvement of response characteristics is enhanced.

For instance, the response characteristics of a liquid crystal indication apparatus of twisted nematic electric field effect type incorporated with a holding plate having a coating film of the silane compound according to the present invention are as shown in the following table:

|  | Not coated | Coated |
|---|---|---|
| Turn-on time (msec) | 110 | 90 |
| Turn-off time (msec) | 140 | 120 |

Note:
Coating film was formed by the use of N-(trimethoxysilylpropyl)-ethylene-diamine. Thickness of liquid crystal layer, 10 μm; Liquid crystal, biphenyl mixed liquid crystal E-7 type manufactured by BDH; Voltage, 3 Vrms 32 Hz.

The reason why the coating film of the silane compound attains the technical effect as explained above is still not certain, but the following assumption may be made: the precursor compound is dissolved to form the silane compound having a silicon atom bearing a hydroxyl group at one terminal and a silicon atom bearing a hydroxyl group or a nitrogen atom constituting an amino group at the other terminal; the silicon atom bearing a hydroxyl group and the nitrogen atom constituting an amino group are fixed on the surface of the holding plate whereby the molecule loses its freedom of orientation; the longitudinal axes of the molecules of the silane compound are fixed in a plane and the liquid crystal molecules are thus orientated in such plane.

A presently preferred embodiment of the invention is illustratively shown below without any limitation of the scope of the invention.

N-(Trimethoxysilylpropyl)-ethylenediamine (hereinafter referred to as "SEA") is dissolved in water to make a concentration of 0.01 % by weight. Into the resulting solution, a soda glass plate provided with a transparent, electro-conductive film of indium oxide as an electrode on the surface is dipped, and ultrasonic excitement is effected. The glass plate is taken out from the solution and dried to obtain a holding plate for liquid crystal on which the electrode is provided and the silane compound originated from SEA is coated.

With respect to the holding plate subjected or not to rubbing treatment and combined with a liquid crystal, the quality of the horizontal homogeneous orientation is observed. The results are shown in the following table wherein O and X indicate respectively good quality and not good quality and Δ indicates almost homogeneous orientation (although of not good quality).

| | Plate | |
|---|---|---|
| Liquid crystal | Subject to rubbing treatment | Subject to SEA treatment and rubbing treatment |
| Methoxybenzyl-idene-n-butyl-aniline | O | O |
| p-Cyanopentyl-biphenyl | X | O |
| p-Methoxy-p-butoxyazo-benzene | X | O |
| Pentyl p-methoxy-benzoate | Δ | O |

What is claimed is:
1. A holding plate for a liquid cyrstal which is adapted to arrange the molecules of the liquid crystal in a substantially horizontal, homogeneous orientation, said holding plate having an electrode provided on the side thereof which contacts the liquid crystal, said holding plate being coated with a film consisting of a silane compound formed by the application of an aqueous solution of a precursor compound of the formula:

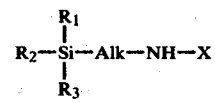

wherein $R_1$, $R_2$, and $R_3$ are each $CH_3-$, $CH_3O-$, $C_2H_5O-$, $C_3H_7O-$, or halogen but at least one of them is $CH_3-$, $CH_3O-$, or $C_2H_5O-$, Alk is $-CH_2CH_2-$, $-CH_2CH_2CH_2-$, $-CH_2CH_2CH_2CH_2-$, or $-CH_2CH_2CH_2CH_2CH_2-$, and X is the residue of a polyamine group consisting of $-NH(CH_2)_2NHCH_2COOCH_3$, $-NH(CH_2)_2-NHCH_2COOC_2H_5$ $-NH(CH_2)_3NHCH_2COOCH_3$, $-NH(CH_2)_3NHCH_2CH_2COOCH_3$, $-NH(CH_2)_2NHCH_2CH_2COOCH_3$, $-NH(CH_2)_3NHCH_2CH_2COOC_2H_5$, $-NH(CH_2)_2NHCH_2CH_2CH_2COOC_2H_5$, $-NH(CH_2CH_2NH)_2H$, or $-NH(CH_2CH_2CH_2NH)_2H$, wherein the precursor compound is dissolved into water to make a concentration of 0.001 to 0.1% by weight, said silane compound being disposed between the electrode and the liquid crystal, the film consisting of the silane compound being provided on the electrode by dipping the holding plate in the aqueous solution, drying the same, and subjecting the holding plate to rubbing to orient the molecular arrangement of the liquid crystal in one direction.

2. The holding plate as set forth in claim 1, wherein the film consisting of the silane compound is provided on the holding plate by subjecting the holding plate to ultrasonic excitement after dipping the holding plate in the aqueous solution and removing the holding plate from the aqueous solution before drying the same.

* * * * *